(12) United States Patent
Bao et al.

(10) Patent No.: US 11,657,998 B2
(45) Date of Patent: May 23, 2023

(54) DISPLAY PLASMA MODULE WITH A PATTERNED STRUCTURE AND MANUFACTURING METHOD THEREOF

(71) Applicant: WUXI VISION PEAK TECHNOLOGY CO., LTD, Wuxi (CN)

(72) Inventors: Jin Bao, Wuxi (CN); Lei Zhang, Wuxi (CN); Shan Chen, Wuxi (CN)

(73) Assignee: WUXI VISION PEAK TECHNOLOGY CO., LTD., Wuxi (CN)

( * ) Notice: Subject to any disclaimer, the term of this patent is extended or adjusted under 35 U.S.C. 154(b) by 982 days.

(21) Appl. No.: 16/335,268

(22) PCT Filed: Mar. 7, 2018

(86) PCT No.: PCT/CN2018/078221
§ 371 (c)(1),
(2) Date: Mar. 21, 2019

(87) PCT Pub. No.: WO2019/140759
PCT Pub. Date: Jul. 25, 2019

(65) Prior Publication Data
US 2021/0349370 A1 Nov. 11, 2021

(30) Foreign Application Priority Data

Jan. 19, 2018 (CN) .......................... 201810054139.2
Mar. 1, 2018 (CN) .......................... 201810171462.8
Mar. 1, 2018 (CN) .......................... 201810171783.8

(51) Int. Cl.
*H01J 11/22* (2012.01)
*G02F 1/16756* (2019.01)
(Continued)

(52) U.S. Cl.
CPC ............ *H01J 11/22* (2013.01); *G02F 1/1339* (2013.01); *G02F 1/167* (2013.01); *G02F 1/1676* (2019.01);
(Continued)

(58) Field of Classification Search
None
See application file for complete search history.

(56) References Cited

U.S. PATENT DOCUMENTS 4,093,534 A 6/1978 Carter et al.
2006/0115767 A1* 6/2006 Shin ...................... G03F 7/0047
430/270.1
(Continued)

FOREIGN PATENT DOCUMENTS

CN 104216193 A 12/2014
CN 107357109 A 11/2017
(Continued)

*Primary Examiner* — Christopher Stanford
*Assistant Examiner* — Journey F Sumlar
(74) *Attorney, Agent, or Firm* — Bayramoglu Law Offices LLC

(57) ABSTRACT

The present invention belongs to the field of electronic display technology, and relates to a display plasma module with a patterned structure, including a pixel electrode and a transparent electrode located above the pixel electrode, characterized in that a display plasma is provided between the pixel electrode and the transparent electrode. A spacer frame is located around the display plasma. A plasma barrier array for uniformly dispersing and stabilizing the display plasma is provided on the pixel electrode and/or the transparent electrode. The plasma barrier array includes a plurality of plasma barrier frames distributed in an array. The display plasma module of the present invention replaces the existing micro-cup structure or microcapsule with the display plasma, and the plasma barrier array for uniformly (Continued)

dispersing and stabilizing the display plasma is provided in the display plasma.

20 Claims, 3 Drawing Sheets

(51) Int. Cl.
    *G02F 1/1676*     (2019.01)
    *G02F 1/1339*     (2006.01)
    *G02F 1/167*     (2019.01)
    *H01J 11/36*     (2012.01)
    *G02F 1/16766*     (2019.01)
    *G02F 1/1681*     (2019.01)

(52) U.S. Cl.
    CPC ........ *G02F 1/1681* (2019.01); *G02F 1/16756* (2019.01); *G02F 1/16766* (2019.01); *H01J 11/36* (2013.01); *G02F 2201/50* (2013.01)

(56) References Cited

U.S. PATENT DOCUMENTS

| | | | |
|---|---|---|---|
| 2007/0080644 A1* | 4/2007 | Hwang | .................... H01J 11/12 313/610 |
| 2009/0180172 A1 | 7/2009 | Murakami | |
| 2011/0175856 A1 | 7/2011 | Hong et al. | |
| 2017/0068145 A1 | 3/2017 | Nakamura et al. | |
| 2018/0040722 A1* | 2/2018 | Obonai | ............. H01L 21/02554 |
| 2019/0391457 A1* | 12/2019 | Bao | ...................... G02F 1/13439 |

FOREIGN PATENT DOCUMENTS

| | | |
|---|---|---|
| EP | 1939677 A1 | 7/2008 |
| EP | 2221661 A2 | 8/2010 |
| EP | 2293142 A1 | 3/2011 |
| JP | 2007065288 A | 3/2007 |
| WO | 2007116732 A1 | 10/2007 |

\* cited by examiner

DISPLAY PLASMA MODULE WITH A PATTERNED STRUCTURE AND MANUFACTURING METHOD THEREOF

CROSS REFERENCE TO THE RELATED APPLICATIONS

This application is the national phase entry of International Application No. PCT/CN2018/078221, filed on Mar. 7, 2018, which is based upon and claims priority to Chinese Patent Application No. 201810054139.2, filed on Jan. 19, 2018, Chinese Patent Application No. 201810171462.8, filed on Mar. 1, 2018, and Chinese Patent Application No. 201810171783.8, filed on Mar. 1, 2018, the entire contents of which are incorporated herein by reference.

TECHNICAL FIELD

The present invention relates to a display plasma module and a manufacturing method thereof, in particular to a plasma display module with a patterned structure and a manufacturing method thereof, which belongs to the field of electronic display technology.

BACKGROUND

The electrophoresis display uses the phoresis phenomenon of the charged colloidal particles under the action of an electric field to display the images and words by driving the electrophoretic particles with different photoelectric properties by the electric field. Compared with the display technique in the prior art, the electrophoretic display has the following characteristics: flexible and easy to bend, light, thin, high contrast, low energy consumption, large visual angle, readable under sunlight, image bistable state, and easy mass production etc.

Electrophoretic display technique was first proposed in the 1970s. The U.S. Pat. No. 3,892,568 discloses a process of preparing an electrophoretic display material containing at least one type of electrophoretic particles. The patent NO. JP1086116 discloses an electrophoretic display system containing at least one type of electrophoretic particles and the electrophoretic liquid is encapsulated with microcapsules. The U.S. Pat. No. 6,930,818 discloses an electrophoretic display unit with the electrophoretic liquid encapsulated by a micro-cup structure. The U.S. Pat. Nos. 5,930,026, 5,961,804, 6,017,584, and 6,120,588 disclose a microencapsulated electrophoretic display unit, wherein the display plasma includes two or more types of electrophoretic particles having different photoelectric properties. Taking a panoramic view of the prior art, the micro-cup electronic ink display screen and the microcapsule electronic ink display screen are both based on tiny cavity structures, namely, micro-cups and microcapsules. These two types of microstructures play a role of dispersedly encapsulating the display plasma.

Although the display screens with these two kinds of structures have been used in actual products, they have the following deficiencies.

1) The microcapsules and the micro-cups themselves have no display function, and are mainly made of transparent materials having a poor covering power. Moreover, a large amount of these materials is used in the entire electrophoretic display system, which lowers the covering power of the entire display screen, the contrast, the resolution, and the service life.

2) There is no doubt that the use of the microcapsules and micro-cup structures will increase the thickness of the entire electrophoretic display material layer, thereby causing lowered contrast and resolution of the display screen, slower response speed, increased driving voltage, slower refresh speed, increased power consumption, and narrowed operating temperature range.

3) The processes of preparing the microcapsules and micro-cups are too complicated, which raises difficulty and waste in manufacturing, reduced yield, material waste, and high manufacturing cost.

SUMMARY

The objective of the present invention is to provide a plasma display module with a patterned structure and a manufacturing method thereof to solve the problems of the electronic display screen in the prior art, which can directly replace the existing micro-cup structure or microcapsule with the display plasma. Moreover, the display plasma is provided with a plasma barrier array for uniformly dispersing and stabilizing the display plasma. Compared with the traditional electrophoretic display screen with the microstructure, the display screen with the patterned structure is much larger than the traditional display screen with the microstructure, and the complicated encapsulation process required by the traditional microstructure is unnecessary. The display screen with the patterned structure has simple display structure, uniform and controllable thickness of the display layer, and is thinner. Moreover, the contrast is increased by more than 10%. The response time is reduced to less than 80 milliseconds. The manufacturing process is simple. The yield and display effect are improved, and the manufacturing cost is reduced.

In order to achieve the above-mentioned technical objective, the technical solutions of the present invention are as follows. A plasma display module with a patterned structure includes a pixel electrode and a transparent electrode located above the pixel electrode, characterized in that a display plasma is provided between the pixel electrode and the transparent electrode, and a spacer frame is located around the display plasma; a plasma barrier array for uniformly dispersing and stabilizing the display plasma is provided on the pixel electrode and/or the transparent electrode; the plasma barrier array includes a plurality of plasma barrier frames distributed in an array.

Further, the pixel electrode includes a plurality of pixel electrode units distributed in an array, and each plasma barrier frame includes 1-100 pixel electrode units.

Further, a width of each plasma barrier frame in the plasma barrier array is not less than a gap between the pixel electrode units in the pixel electrode, and a height of each plasma barrier frame is not more than 20 microns.

Further, a material of the plasma barrier frames in the plasma barrier array and the spacer frame is acrylic resin, polyurethane resin, epoxy resin, organic silicone resin or silicon dioxide.

Further, the pixel electrode is internally embedded in the Thin Film Transistor (TFT) glass substrate, and the pixel electrode and the display plasma are adhered to each other by a lightproof insulating adhesive layer.

Further, an electrically conductive layer is provided between the display plasma and the transparent electrode, and an electrically conductive layer is also provided between the spacer frame and the transparent electrode; and a display area protection layer is provided between the spacer frame and the electrically conductive layer, and a display area protection layer is also provided between an edge of the display plasma and the electrically conductive layer.

Further, an integrated circuit (IC) module and a flexible circuit board are provided on one side of the spacer frame, and the IC module and the flexible circuit board are both attached to the pixel electrode through an electrically conductive adhesive tape; the IC module, the flexible circuit board and the electrically conductive adhesive tape are fixed and sealed on the pixel electrode by RTV silicone.

Further, the display plasma has a thickness of 2-300 microns; an electrophoretic fluid in the display plasma has a viscosity of 100-100000 cP; and the display plasma includes at least two kinds of electrophoretic particles having different photoelectric properties.

Further, the spacer frame and the display plasma may include supporting microspheres; a material of the supporting microsphere includes resin microspheres and glass microspheres; and the supporting microsphere has a diameter of 2-60 microns.

In order to achieve the above-mentioned technical objective, the present invention also provides a method for manufacturing a display plasma module with a patterned structure, characterized in that the method includes the following steps:

step 1: pre-preparing a plasma barrier array on an electrically conductive layer of a pixel electrode and/or a transparent electrode;

step 2: embedding the pixel electrode into a TFT glass substrate, and placing the TFT glass substrate on an adhesive dispensing platform;

step 3: dispensing a frame sealing adhesive on the pixel electrode to form a spacer frame;

step 4: silk-screen printing a display plasma in the spacer frame;

step 5: coating an electrically conductive silver paste in the spacer frame;

step 6: laminating an electrically conductive layer, the transparent electrode and a display area protection layer on the entire spacer frame, and performing a curing;

step 7: trimming off a part of the transparent electrode, the electrically conductive layer and the display area protection layer to expose a predetermined position for binding an IC module on the pixel electrode;

step 8: attaching the IC module and a flexible circuit board to an edge of the pixel electrode by an electrically conductive adhesive tape;

step 9: fixing and sealing edges of the IC module, the flexible circuit board, and the electrically conductive adhesive tape on the pixel electrode by an RTV silicone to complete a manufacture of an electronic ink display screen.

Further, in the step 1, a lightproof insulating adhesive layer may be pre-coated on a surface of the pixel electrode, and supporting microspheres may be pre-coated on the insulating adhesive layer.

Further, in the step 1, the plasma barrier array is covered on a surface of the electrically conductive layer of the pixel electrode or the transparent electrode by printing, coating or adhesive dispensing, and then cured by photo curing, heat curing or moisture curing, or the plasma barrier array is configured by a physical property or a chemical property.

Compared with the traditional electronic ink display screen, the present invention has the following advantages.

1) Compared with the traditional microstructure electrophoretic display screen, without involving the traditional micro-capsule or micro-cup in the display, the display effects will be affected. In the present invention, the micro-capsule or the micro-cup is replaced with the display plasma, so the display effects are better and the contrast is increased by more than 10%.

2) The display plasma of the present invention can reduce the thickness of the entire electrophoretic display layer, reduce the response time to less than 80 milliseconds, reduce the driving voltage to +1.5 V to +8V and −8V to −1.5V, and broaden the operating temperature range to −30-70° C. Meanwhile, the production cost is reduced.

3) In the present invention, a patterned plasma barrier array is provided between the pixel electrode and the transparent electrode, which can effectively and uniformly disperse and stabilize the display plasma, and improve the display effects.

4) The display area protection layer of the present invention protects the display plasma of the display area, and plays a role of lightproof and insulation.

5) The lightproof layer and the insulating adhesive layer of the present invention are used to protect the pixel electrode from optical radiation, isolate the display plasma and the pixel electrode, and prevent the display plasma from damaging the pixel electrode.

6) The processes of the present invention can be used to manufacture a large-scale display plasma module more than 100 inches.

Figure 1:
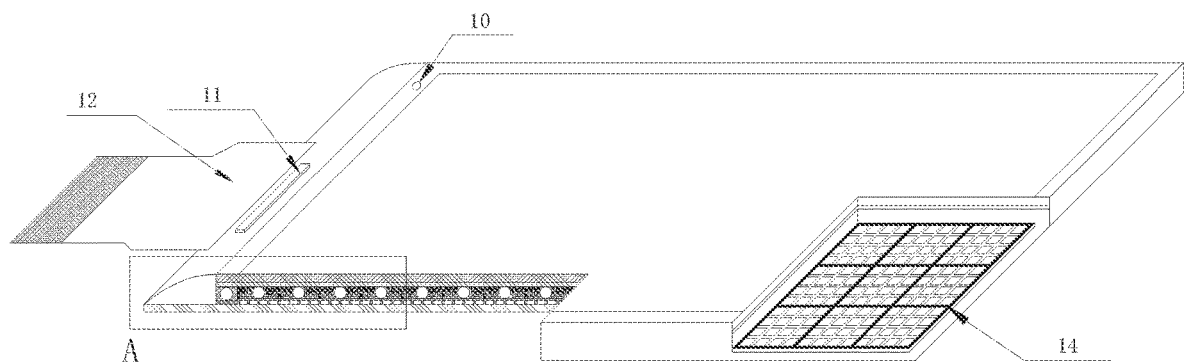
FIG. 1 is a side view showing the structure of Embodiment 1 of the present invention.

The description of reference designators: 1: transparent electrode; 2: electrically conductive layer; 3: display plasma; 4: supporting microsphere; 5: lightproof insulating adhesive layer; 6: spacer frame; 7: TFT glass substrate; 8: display area protection layer; 9: RTV silicone; 10: electrically conductive silver paste; 11: IC module; 12: flexible circuit board; 13: pixel electrode; 14: plasma barrier array.

DETAILED DESCRIPTION OF THE EMBODIMENTS

The present invention will be further described hereinafter with reference to the specific drawings and embodiments.

The present invention is not limited to the following embodiments, and the drawings being referred to in the following description are intended to illustrate the contents of the present invention, namely, the present invention is not limited to the structure of the electronic ink display screen exemplified in the drawings.

Figure 2:
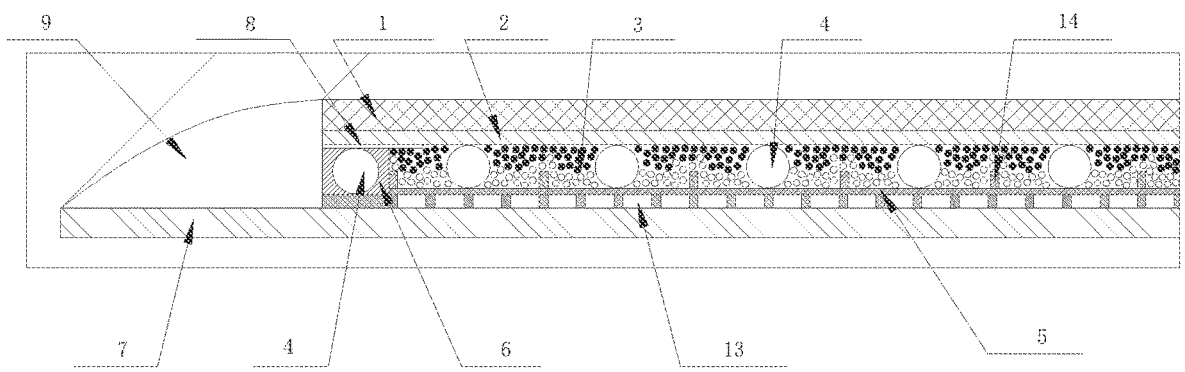
FIG. 2 is a cross-sectional view showing the structure of portion A of FIG. 1.

As shown in FIG. 1 and FIG. 2, in Embodiment 1, a double-particle electronic ink display screen is take as an example. A plasma display module with a patterned structure includes a pixel electrode 13 and a transparent electrode 1 located above the pixel electrode 13, characterized in that a display plasma 3 is provided between the pixel electrode 13 and the transparent electrode 1, and a spacer frame 6 is located around the display plasma 3. The plasma barrier array 14 for uniformly dispersing and stabilizing the display plasma 3 is provided on the pixel electrode 13. The plasma barrier array 14 includes a plurality of plasma barrier frames distributed in an array, and the pixel electrode 13 includes a plurality of pixel electrode units arranged in an array. The pixel electrode 13 is internally embedded in the TFT glass substrate 7. The pixel electrode 13 and the display plasma 3 are adhered to each other by a lightproof insulating adhesive layer 5. An electrically conductive layer 2 is provided between the display plasma 3 and the transparent electrode 1, and an electrically conductive layer 2 is also provided between the spacer frame 6 and the transparent electrode 1. The electrically conductive layer 2 may be Indium Tin Oxide (ITO), silver nanowires, graphene, and carbon nanotubes etc. A basic material of the transparent electrode 1 includes glass, plastic, and glass or plastic with a protection layer etc. The plastic basic material includes Polyimide (PI), Polyethylene Naphthalate (PEN), and Polyethylene Terephthalate (PET) etc. The protection layer is deposited onto the surface of the basic material by the evaporation deposition. The protection layer plays a role of waterproofing and ultraviolet proof. The display area protection layer 8 is provided between the spacer frame 6 and the electrically conductive layer 2, and the display area protection layer 8 is also provided between the edge of the display plasma 3 and the electrically conductive layer 2. The material of the display area protection layer 8 includes polyurethane, acrylic resin, epoxy resin or natural polymer. An IC module 11 and a flexible circuit board 12 are provided on one side of the spacer frame 6, and are attached to the pixel electrode 13 by an electrically conductive adhesive tape. The edges of the IC module 11, the flexible circuit board 12 and the electrically conductive adhesive tape are fixed and sealed on the pixel electrode 13 by an RTV silicone 9.

Each plasma barrier frame in the plasma barrier array 14 includes 1-100 pixel electrode units, preferably 4-20 pixel electrode units. The width of the plasma barrier frame in the plasma barrier array 14 is not less than the gap between the pixel electrode units in the pixel electrode 13. The height of the plasma barrier frame is not more than 20 microns, preferably not more than 10 microns. There is a gap between the plasma barrier frame and the transparent electrode 1. The material of the plasma barrier frame in the plasma barrier array 14 and the material of the spacer frame 6 include acrylic resin, urethane resin, epoxy resin, organic silicone resin or silicon dioxide.

The material of the lightproof insulating adhesive layer 5 includes polyurethane, acrylic resin, epoxy resin, and natural polymer etc. The adhesive may be water type, solvent type, hot-melt type and photo curing type, preferably, the water type and the photo curing type, so as to protect the pixel electrode 13 from being irradiated, thereby affecting the performance and the service life of the display screen. Meanwhile, the display plasma 3 and the pixel electrode 13 are isolated to prevent the display plasma 3 from damaging the pixel electrode 13.

The display plasma 3 has a thickness of 2-300 microns, and the electrophoretic fluid of the display plasma 3 has a viscosity of 100-100000 cP. The display plasma 3 includes a plurality of white particles and a plurality of black particles. The pixel electrode 13 may include a segment code and a dot matrix. Under the different electric fields applied to the white particles and black particles and driven by the IC module 11, the electrophoretic particles can move through the gap between the plasma barrier frame and the transparent electrode 1, so as to display the black and white colors on the display screen, thereby improving the contrast and display effect of the display screen. The plasma barrier frame protects the display plasma 3 from moving freely on the horizontal surface, thereby ensuring the stability of the display plasma 3. The basic material of the pixel electrode 13 may be glass and plastic etc. The plastic basic material includes PI, PEN, and PET etc. The supporting microspheres 4 may be provided in the spacer frame 3 and the display plasma 3, and the material of the supporting microspheres 4 includes resin microspheres and glass microspheres. The supporting microspheres 4 have a diameter of 2-60 μm, which depends on the application of the display module. The supporting microsphere 4 is pre-coated on the lightproof insulating adhesive layer 5 on the surface of the pixel electrode 13, and the material of the supporting microsphere includes resin microspheres and glass microspheres. The supporting microsphere 4 has a diameter of 2-60 microns, preferably 5-30 microns.

Figure 3:
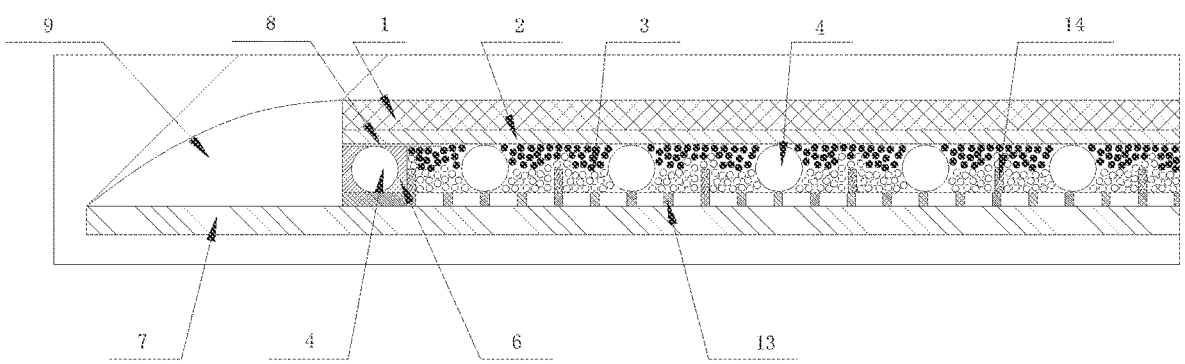
FIG. 3 is a cross-sectional view showing the structure of Embodiment 1 without an insulating lightproof layer of the present invention.

As shown in FIG. 3, in the display plasma module with a patterned structure of Embodiment 1, no lightproof insulating adhesive layer 5 is provided between the pixel electrode 13 and the display plasma 3.

Figure 4:
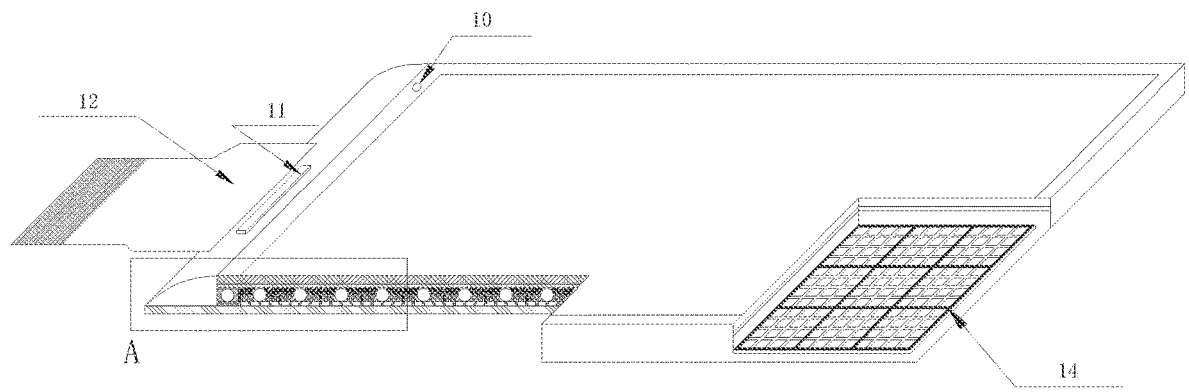
FIG. 4 is a side view showing the structure of Embodiment 2 of the present invention.
Figure 5:
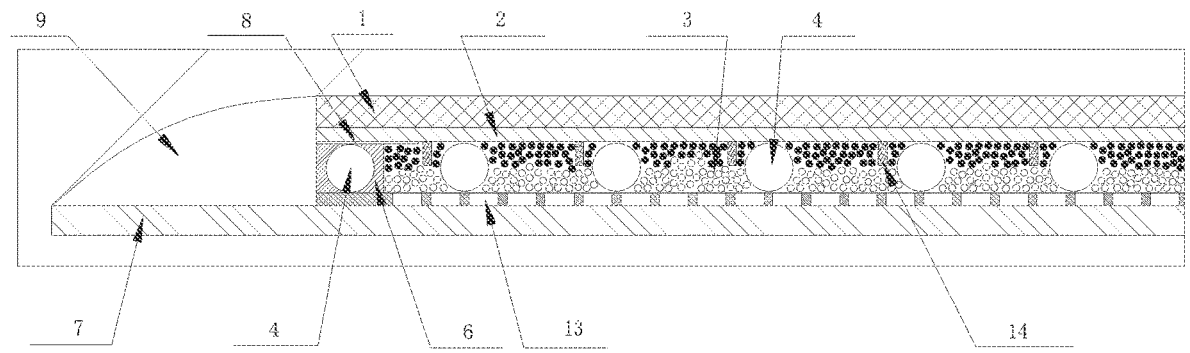
FIG. 5 is a cross-sectional view showing the structure of portion A of FIG. 4.

As shown in FIG. 4 and FIG. 5, in Embodiment 2, a double-particle electronic ink display screen is taken as an example. A display plasma module with a patterned structure includes a pixel electrode 13 and a transparent electrode 1 located above the pixel electrode 13, characterized in that a display plasma 3 is provided between the pixel electrode 13 and the transparent electrode 1, and a spacer frame 6 is located around the display plasma 3. No lightproof insulating adhesive layer 5 is provided between the pixel electrode 13 and the display plasma 3. The plasma barrier array 14 for uniformly dispersing and stabilizing the display plasma 3 is provided on the transparent electrode 13. The plasma barrier array 14 includes a plurality of plasma barrier frames distributed in an array, and the pixel electrode 13 includes a plurality of pixel electrode units arranged in an array. Each plasma barrier frame of the plasma barrier array 14 includes 4-20 pixel electrode units. There is a gap between the plasma barrier frame and the pixel electrode 13. The pixel electrode 13 may include a segment code and a dot matrix. Under the drive of the IC module, the electrophoretic particles can move through the gap between the plasma barrier frame and the pixel electrode 13. The plasma barrier frame protects the display plasma 3 from moving freely on the horizontal surface, which ensures the stability of the display plasma 3, makes the display screen display black and white colors, and improves the contrast and display effect of the display screen.

Figure 6:
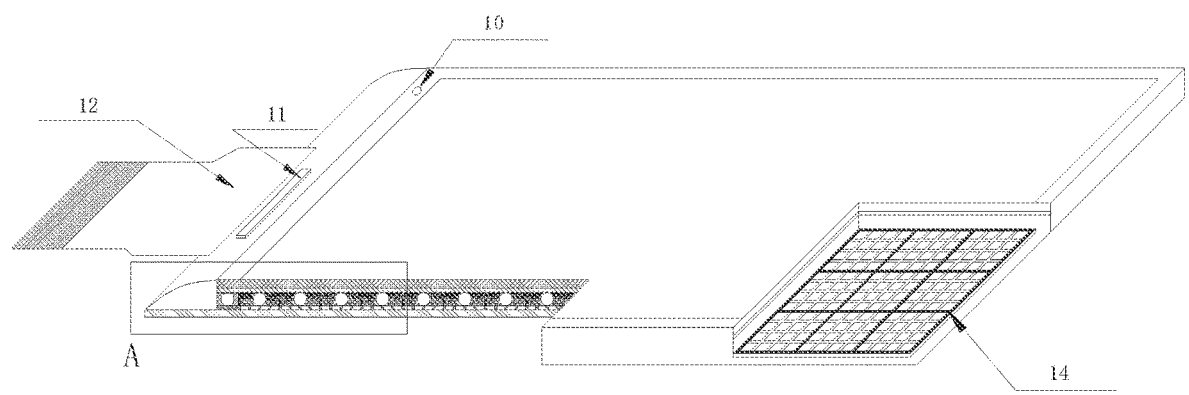
FIG. 6 is a side view showing the structure of Embodiment 3 of the present invention.
Figure 7:
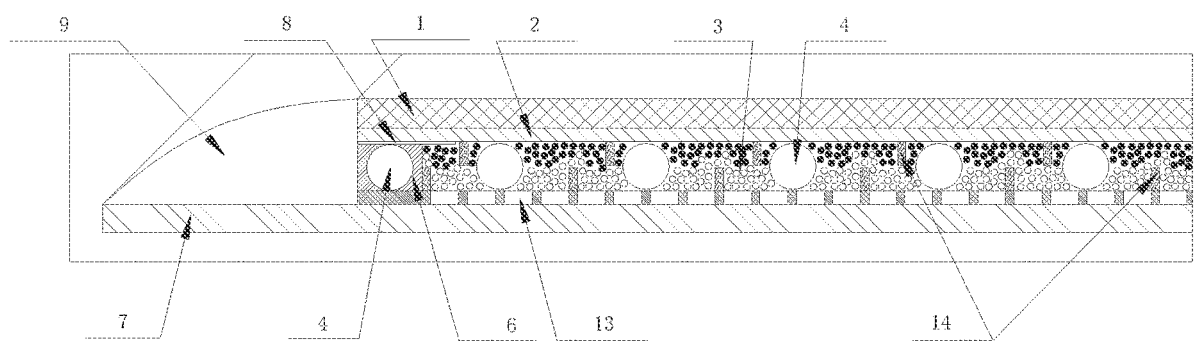
FIG. 7 is a cross-sectional view showing the structure of portion A of FIG. 6.

As shown in FIG. 6 and FIG. 7, in Embodiment 3, a double-particle electronic ink display screen is taken as an example. A display plasma module with a patterned structure includes a pixel electrode 13 and a transparent electrode 1 located above the pixel electrode 13, characterized in that a display plasma 3 is provided between the pixel electrode 13 and the transparent electrode 1, and a spacer frame 6 is located around the display plasma 3. No lightproof insulating adhesive layer 5 is provided between the pixel electrode 13 and the display plasma 3. The plasma barrier array 14 for uniformly dispersing and stabilizing the display plasma 3 is provided both on the pixel electrode 13 and the transparent electrode 1. The plasma barrier array 14 includes a plurality of plasma barrier frames distributed in an array, and the pixel electrode 13 includes a plurality of pixel electrode units arranged in an array. Each plasma barrier frame of the plasma barrier array 14 includes 4-20 pixel electrode units. The plasma barrier frame on the pixel electrode 13 and the plasma barrier frame on the transparent electrode 1 are located away from each other for a certain distance and are not in a one-to-one correspondence, so as to ensure that the electrophoretic fluid in the display plasma 3 can move freely. The pixel electrode 13 may include segment code or dot matrix etc. Under the drive of the IC module. the electrophoretic particles can move through gaps between the plasma barrier frames, between the plasma barrier frame and the transparent electrode 1, and between the plasma barrier frame and the pixel electrode 13. The plasma barrier frame protects the display plasma 3 from moving freely on the horizontal surface, which ensures the stability of the display plasma 3, enables the display screen to display black and white colors, and improves the contrast and display effect of the display screen.

A method for manufacturing a display plasma module with a patterned structure according to the above-mentioned embodiment, characterized in that the method includes the following steps.

Step 1: a plasma barrier array 14 is pre-prepared on a pixel electrode 13 and/or a transparent electrode 1. The surface of a pixel electrode 7 may be pre-coated with supporting microspheres 4. Before coating the supporting microspheres 4, a lightproof insulating adhesive layer 5 may be coated in advance, or no lightproof insulating adhesive layer 5 is be coated.

The plasma barrier array 14 is covered on the surface of the pixel electrode 13 by printing, coating or adhesive dispensing, and then is cured by photo curing, heat curing or moisture curing.

Step 2: the pixel electrode 13 embedded in a TFT glass substrate 7, and the TFT glass substrate 7 is placed on an adhesive dispensing platform.

Step 3: a frame sealing adhesive is dispensed on the pixel electrode 13 by an adhesive dispenser to form a spacer frame 6. The material of the frame sealing adhesive includes epoxy resin, acrylic resin, and polyurethane resin etc. The curing method of the frame sealing adhesive may be photo curing, heat curing, or moisture curing etc. Preferably, the curing method is the photo curing. The material of the frame sealing adhesive may include the supporting microspheres 4 or not. The spacer frame 6 has a width of 2-300 microns, preferably 50-200 microns. The spacer frame 6 has a height of 5-150 microns, preferably 15-60 microns.

Step 4: the display plasma 3 is printed in the spacer frame 6 by the silk-screen printing equipment. The display plasma 3 may be applied on the surface of the pixel electrode 13 or the transparent electrode 1 by printing, coating, adhesive dispensing or the like. Preferably, the applying method includes silk-screen printing, intaglio printing, and slot die coating etc.

Step 5: a conductive silver paste 10 is coated in the spacer frame 6. The conductive silver paste 10 may also be conductive sliver beads or conductive gold beads.

Step 6: the electrically conductive layer 2, the transparent electrode 1, and the display area protection layer 8 are laminated onto the entire spacer frame 6. and a curing is performed. In this case, the electrically conductive silver paste 10 is electrically connected to the pixel electrode 13 and electrically connected to the transparent electrode 1 through the electrically conductive layer 2.

Step 7: a part of the transparent electrode 1, the electrically conductive layer 2, and the display area protection layer 8 are trimmed off by a glass cutting machine to expose a predetermined position for binding the IC module 11 on the pixel electrode 13.

Step 8: the IC module 11 and the flexible circuit board 12 are both attached on the edge of the pixel electrode 13 by an electrically conductive adhesive tape according to the Chip On Glass (COG) process.

Step 9: the edges of the IC module 11, the flexible circuit board 12, and the electrically conductive adhesive tape are fixed and sealed on the pixel electrode 13 through the RTV silicone 9 by the RTV silicone printing process, so as to complete the manufacture of the electronic ink display screen.

The display plasma 3 of the present invention includes at least two kinds of electrophoretic particles having different optical properties. The preferred colors of the electrophoretic particles having different optical properties include white, black, red, green, blue, and yellow etc. to display black and white, single color, double colors, multiple colors, and true color etc. Meanwhile, the display plasma 3 may include a fluorescent material. The fluorescent material includes an inorganic fluorescent material and an organic fluorescent material. The inorganic fluorescent material includes a rare earth fluorescent material and a metal sulfide etc. The organic fluorescent material includes a small molecule fluorescent material and a macromolecule fluorescent material etc.

The display plasma module of the present invention is directly provided with the display plasma 3 without using the traditional microstructure such as a microcapsule or a micro-cup. A plasma barrier array 14 is provided in the display plasma 3 between the transparent electrode 1 and the pixel electrode 13. Thus, the whole production process is simplified. The display structure is simpler. The thickness of the display layer is uniform and controllable. The electrophoretic fluid in the display plasma 3 not only can move freely, but also can be uniformly dispersed and stabilized by the plasma barrier array 14, so as to make the display effects of the entire display screen better. In the module structure of the present invention, the traditional microstructure such as the microcapsule and the micro-cup is eliminated, so that the production efficiency and the yield are improved, and the display performance and the service life are increased.

The present invention and embodiments thereof are described above. The description is nonrestrictive, and the structure shown in the drawings is merely one of the embodiments of the present invention. The actual structure is not limited thereto. In short, a person of ordinary skill in the art inspired by the present invention can design structures, methods, and embodiments similar to the technical solution without creative efforts and departing from the inventive concept of the present invention. These structures, modes and embodiments should also be considered as falling within the scope of the present invention.

What is claimed is:

1. A display plasma module with a patterned structure, comprising a pixel electrode and a transparent electrode located above the pixel electrode, wherein a display plasma is provided between the pixel electrode and the transparent electrode, and a spacer frame is located around the display plasma; a plasma barrier array for uniformly dispersing and stabilizing the display plasma is provided on the pixel electrode and the transparent electrode, or on one of the pixel electrode and the transparent electrode; the plasma barrier array comprises a plurality of plasma barrier frames distributed in an array; the pixel electrode comprises a plurality of pixel electrode units distributed in an array, and each plasma barrier frame comprises 1-100 pixel electrode units.

2. The display plasma module with the patterned structure according to claim 1, wherein a width of each plasma barrier frame in the plasma barrier array is not less than a width of a gap between the pixel electrode units in the pixel electrode, and a height of each plasma barrier frame is not more than 20 microns.

3. The display plasma module with the patterned structure according to claim 1, wherein a material of the plasma barrier frame in the plasma barrier array and a material of the spacer frame comprise acrylic resin, polyurethane resin, epoxy resin, organic silicone resin, or silicon dioxide.

4. The display plasma module with the patterned structure according to claim 1, wherein an electrically conductive layer is provided between the display plasma and the transparent electrode, and the electrically conductive layer is also provided between the spacer frame and the transparent electrode; a display area protection layer is provided between the spacer frame and the electrically conductive layer, and the display area protection layer is also provided between an edge of the display plasma and the electrically conductive layer.

5. The display plasma module with the patterned structure according to claim 1, wherein the display plasma has a thickness of 2-300 microns; an electrophoretic fluid in the display plasma has a viscosity of 100-100000 cP; and the display plasma comprises at least two kinds of electrophoretic particles having different photoelectric properties.

6. The display plasma module with the patterned structure according to claim 1, wherein the spacer frame and the display plasma comprise supporting microspheres; a material of the supporting microspheres comprises resin microspheres and glass microspheres; and the supporting microspheres have a diameter of 2-60 microns.

7. The display plasma module with the patterned structure according to claim 1, wherein the plasma barrier array is provided on the pixel electrode.

8. The display plasma module with the patterned structure according to claim 1, wherein the plasma barrier array is provided on the transparent electrode.

9. The display plasma module with the patterned structure according to claim 1, wherein the plasma barrier array is provided on both the pixel electrode and the transparent electrode.

10. The display plasma module with the patterned structure according to claim 1, wherein each plasma barrier frame comprises 4-20 pixel electrode units.

11. A display plasma module with a patterned structure, comprising a pixel electrode and a transparent electrode located above the pixel electrode, wherein a display plasma is provided between the pixel electrode and the transparent electrode, and a spacer frame is located around the display plasma; a plasma barrier array for uniformly dispersing and stabilizing the display plasma is provided on the pixel electrode and the transparent electrode, or on one of the pixel electrode and the transparent electrode; the plasma barrier array comprises a plurality of plasma barrier frames distributed in an array; the pixel electrode is internally embedded in a Thin Film Transistor (TFT) glass substrate, and the pixel electrode and the display plasma are adhered to each other by a lightproof insulating adhesive layer.

12. The display plasma module with the patterned structure according to claim 11, wherein the pixel electrode comprises a plurality of pixel electrode units distributed in an array, and each plasma barrier frame comprises 1-100 pixel electrode units.

13. The display plasma module with the patterned structure according to claim 11, wherein a width of each plasma barrier frame in the plasma barrier array is not less than a width of a gap between the pixel electrode units in the pixel electrode, and a height of each plasma barrier frame is not more than 20 microns.

14. The display plasma module with the patterned structure according to claim 11, wherein a material of the plasma barrier frame in the plasma barrier array and a material of the spacer frame comprise acrylic resin, polyurethane resin, epoxy resin, organic silicone resin, or silicon dioxide.

15. The display plasma module with the patterned structure according to claim 11, wherein an electrically conductive layer is provided between the display plasma and the transparent electrode, and the electrically conductive layer is also provided between the spacer frame and the transparent electrode; a display area protection layer is provided between the spacer frame and the electrically conductive layer, and the display area protection layer is also provided between an edge of the display plasma and the electrically conductive layer.

16. The display plasma module with the patterned structure according to claim 11, wherein the display plasma has a thickness of 2-300 microns; an electrophoretic fluid in the display plasma has a viscosity of 100-100000 cP; and the display plasma comprises at least two kinds of electrophoretic particles having different photoelectric properties.

17. The display plasma module with the patterned structure according to claim 11, wherein the spacer frame and the display plasma comprise supporting microspheres; a material of the supporting microspheres comprises resin microspheres and glass microspheres; and the supporting microspheres have a diameter of 2-60 microns.

18. A method for manufacturing a display plasma module with a patterned structure, comprising the following steps:
   step 1: pre-preparing a plasma barrier array on an electrically conductive layer of a pixel electrode and a transparent electrode, or on one of the pixel electrode and the transparent electrode;
   step 2: embedding the pixel electrode into a TFT glass substrate, and placing the TFT glass substrate on an adhesive dispensing platform;
   step 3: dispensing a frame sealing adhesive on the pixel electrode to form a spacer frame;
   step 4: silk-screen printing a display plasma in the spacer frame;
   step 5: coating an electrically conductive silver paste in the spacer frame;
   step 6: laminating an electrically conductive layer, the transparent electrode, and a display area protection layer on the entire spacer frame, and performing a curing;
   step 7: trimming off a part of the transparent electrode, the electrically conductive layer, and the display area protection layer to expose a predetermined position for binding an IC module on the pixel electrode;
   step 8: attaching the IC module and a flexible circuit board to an edge of the pixel electrode by an electrically conductive adhesive tape;
   step 9: fixing and sealing edges of the IC module, the flexible circuit board and the electrically conductive adhesive tape on the pixel electrode by an RTV silicone to complete a manufacture of an electronic ink display screen.

19. The method for manufacturing the display plasma module with the patterned structure according to claim 18, wherein in the step 1, a lightproof insulating adhesive layer is pre-coated on a surface of the pixel electrode, and supporting microspheres are pre-coated on the insulating adhesive layer.

20. The method for manufacturing the display plasma module with the patterned structure according to claim 18, wherein in the step 1, the plasma barrier array is covered on a surface of the electrically conductive layer of the pixel electrode or the transparent electrode by printing, coating or adhesive dispensing, and then cured by a photo curing, a heat curing, or a moisture curing, or the plasma barrier array is configured by a physical property or chemical property.

* * * * *